July 3, 1951  N. J. MEDVED  2,559,196
TIME SAVER FRYING PAN LID
Filed July 12, 1950  2 Sheets-Sheet 1
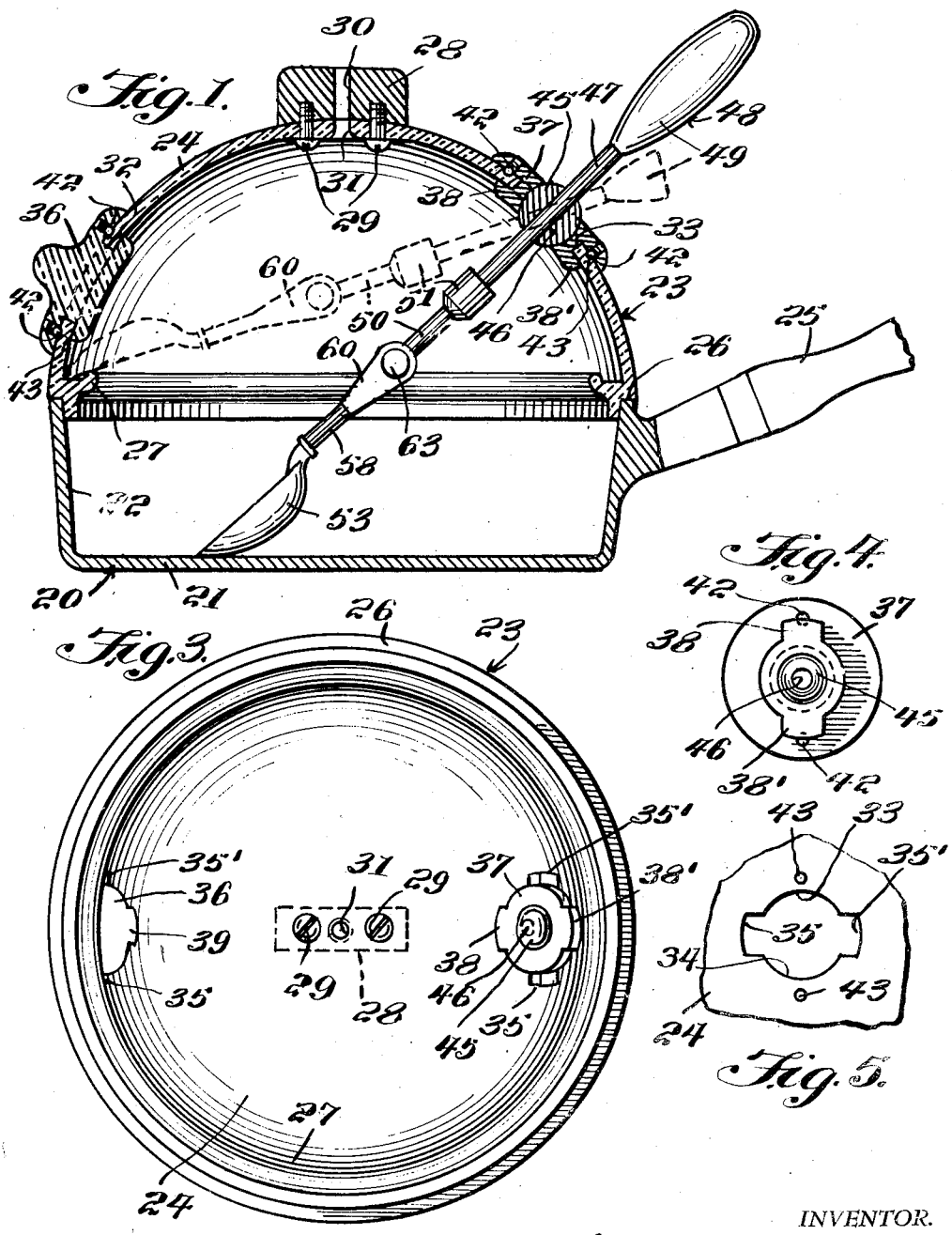
INVENTOR.
Nicholas J. Medved,
BY Victor J. Evans & Co.
ATTORNEYS July 3, 1951  N. J. MEDVED  2,559,196
TIME SAVER FRYING PAN LID
Filed July 12, 1950  2 Sheets-Sheet 2
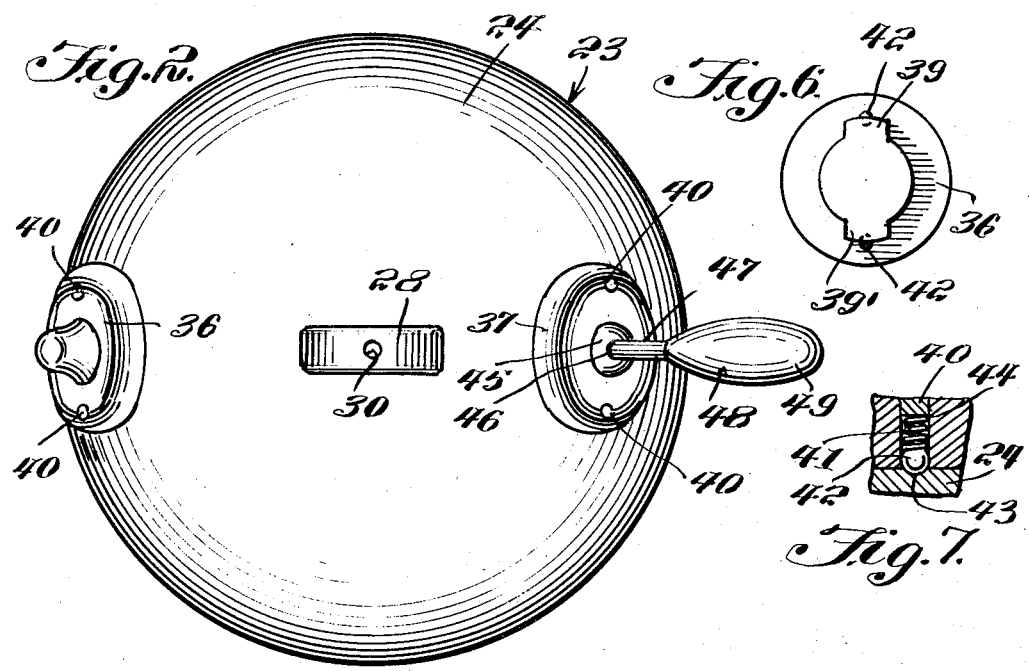
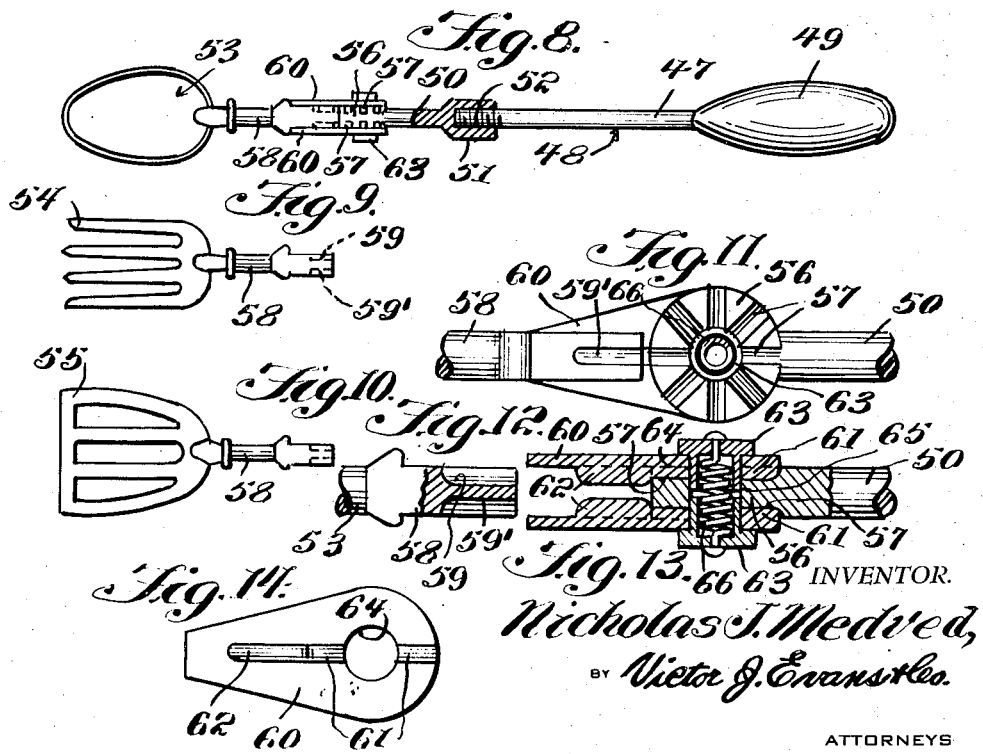
INVENTOR.
Nicholas J. Medved,
BY Victor J. Evans & Co.
ATTORNEYS Patented July 3, 1951

2,559,196

UNITED STATES PATENT OFFICE 2,559,196

TIME SAVER FRYING PAN LID

Nicholas J. Medved, Bellevue, Pa.

Application July 12, 1950, Serial No. 173,414

3 Claims. (Cl. 259—116)

This invention relates to cooking equipment, and more particularly to a lid or cover for frying pans, pots boilers, and the like.

The object of the invention is to provide a lid for a frying pan or pot, the lid being transparent, so that the user can observe the contents of the frying pan or pot, the lid serving to prevent persons standing nearby from being splattered by hot grease or foodstuffs in the frying pan, the lid also serving to prevent loss of the foodstuffs being cooked.

Another object of the invention is to provide a lid or cover for a frying pan or pot, the lid having a suitable utensil, such as a spoon, fork or spatula movably mounted therein, whereby such utensil can be used to stir the foods being cooked, the utensil adapted to be supported above the foodstuffs when not needed.

Another object of the invention is to provide a lid which is extremely simple and inexpensive to manufacture.

Other objects and advantages will be apparent during the course of the following description.

In the accompanying drawings forming a part of this application, and in which like numerals are used to designate like parts throughout the same:

Figure 1 is a vertical sectional view taken through a frying pan, with the lid of the present invention mounted thereon;

Figure 2 is a top plan view of the assembly of Figure 1;

Figure 3 is a bottom plan view of the lid of the present invention;

Figure 4 is a bottom plan view of the support member having the ball socket joint therein;

Figure 5 is a fragmentary plan view showing one of the openings in the lid for receiving the support member;

Figure 6 is a plan view of the closure plug to be fitted in one of the openings in the lid;

Figure 7 is an enlarged sectional view showing one of the spring pressed detents for holding the plug or support member in place on the lid;

Figure 8 is a plan view of the spoon, with parts broken away and in section;

Figure 9 is a plan view of a fork head for attachment to the utensil;

Figure 10 is a plan view of a spatula head for attachment to the utensil handle;

Figure 11 is an enlarged fragmentary view showing the adjustable joint connecting the utensil head to the stem, one of the plates being removed;

Figure 12 is an enlarged sectional view, with parts broken away and in section, showing one of the heads;

Figure 13 is a sectional view taken through the adjustable connecting joint;

Figure 14 is a plan view of one of the plates constituting part of the connecting joint.

Referring in detail to the drawings, the numeral 20 designates a vessel, such as a frying pan, and the frying pan includes a horizontally disposed bottom wall 21 and an upwardly extending annular side wall 22. A suitable handle 25 projects from the exterior surface of the side wall 22, Figure 1, so that the frying pan can be handled easily and safely. The present invention is directed to a lid or cover which is designated generally by the numeral 23, the lid of the present invention serving to prevent the contents of the frying pan from splattering onto persons standing nearby and possibly causing injury to such persons.

The lid 23 of the present invention includes an arcuate or curved body 24 which is preferably fabricated of a transparent, heat-resistant material, such as Pyrex glass. The lower portion of the body 24 is provided with an annular cutout 26, Figures 1 and 3, and the cutout 26 serves to snugly receive therein the upper edge of the annular wall 22. An annular ledge 27 projects inwardly from the body 24 adjacent the lower end thereof for a purpose to be later described.

Secured to the outer surface of the body 24, adjacent the top thereof, is a handle 28 which is preferably fabricated of a suitable heat-resistant material. The handle 28 can be used for lifting the lid 23 from the utensil when desired. The handle 28 is secured to the body 24 by suitable securing elements, such as screws 29. The handle 28 is provided with a vent 30 which registers with a similar vent 31 in the body 24, so that steam, vapors and the like can safely escape therethrough during the process of cooking foodstuffs.

The body 24 is provided with a pair of spaced openings 32 and 33, Figure 1, and the openings 32 and 33 are arranged at different elevations or levels. The exact shape of the opening 33 is shown in Figure 5, and since the opening 32 has the same shape as the opening 33, a description of the shape and function of opening 33 will suffice for both of the openings. The opening 33 includes a central, circular portion 34, and communicating with the central portion 34 is a pair of recesses 35 and 35'. A closure plug 36, Figure 6, is adapted to be arranged in engagement with either the opening 32 or the opening 33, and a support member 37, Figure 4, is adapted to be arranged in engagement with the other of these openings. In other words, the closure member 36 and support member 37 are interchangeable so that they can be used in whichever of the openings 32 or 33 is desired. The support member 37, Figure 4, is provided with a pair of diametrically opposed ears 38 and 38'. Thus, in order to properly position the support member 37 in the opening 33, the support member 37 is arranged so that the ears 38 and 38' register with the recesses 35 and 35'. Then, the support member 37 can be inserted all the way into the position shown in Figure 1, and the support member 37 can be rotated slightly, whereby the ears 38 and 38' will move away from the recesses 35 and 35', so that the support member 37 will be clamped to the body 24.

The closure plug 36, Figure 6, is also provided with a pair of diametrically opposed lugs 39 and 39', and these lugs function in the same manner as the previously-described lugs or ears 38 and 38'. For maintaining the closure plug 36 and the support member 37 immobile in their proper positions on the body 24, each of these members is provided with a pair of spring pressed detent assemblies, Figure 7. Each of the spring pressed detent assemblies includes a plug 40 which is arranged in an opening 44 which is arranged in the support member 37 or closure plug 36, the plug 40 being secured in any suitable manner to these members. The coil spring 41 has one end abutting the plug 40, and the other end of the coil spring 41 is secured to a ball 42, the ball 42 being normally urged into a recess or socket 43 which is formed in the exterior surface of the body 24. Thus it will be seen that when the closure plug 36 or support member 37 is positioned in its proper place on the body 24, the balls 42 will be urged into the sockets 43 to thereby help maintain the members 36 and 37 immobile in their proper positions. When the members 36 and 37 are to be removed from the openings 32 or 33, these members can be rotated, and a small amount of pressure on these members will be sufficient to dislodge the balls 42 from the sockets 43.

Rotatably supported by the support member 37 is a ball 45, there being an opening 46 arranged in the ball 45. A shaft 47, which constitutes part of a utensil 48, is slidably arranged in the opening 46, the shaft 47 having a suitable handle 49 mounted on an end thereof, and the handle 49 is adapted to be gripped in the user's hand when the utensil 48 is to be manipulated. When the utensil 48 is to be used for stirring or agitating the foodstuffs in the frying pan 20, the utensil can be arranged in the solid line position shown in Figure 1, and when the utensil is not being used to stir the foodstuffs, it can be moved to the dotted line position of Figure 1, whereby it will be conveniently supported on the ledge 27.

The utensil 48 includes a stem 50 which is provided with an interiorly threaded socket 51, Figure 8, and the socket 51 is adapted to threadedly receive therein the threaded end 52 of the shaft 47. Thus, when the utensil is to be arranged in engagement with the support member 37, the shaft 47 is separated from the stem 50 by means of this threaded connection, whereby the shaft 47 can be slid through the opening 46. Various types of heads can be detachably connected to the stem 50. Thus, as shown in Figure 8, a spoon head 53 is detachably connected to the stem 50, but it is to be understood that a fork head 54, Figure 9, or a spatula head 55, Figure 10, can be attached to the stem 50, if the user desires to use these tools. Since the means and method of connecting the spoon head 53 to the stem 50 is the same as the means for connecting the fork head and spatula head to the stem, a description of the connection of the spoon head 53 to the stem 50 will suffice for all of these.

The joint for connecting these heads to the stem 50 is shown in detail in Figures 11 through 14, and the joint comprises a bearing member 56, the bearing member 56 being provided with a plurality of radially extending grooves 57 on each of its sides, Figure 11.

The spoon head 53 includes a spindle 58 which is provided with a pair of opposed, elongated sockets 59 and 59', Figure 12, for a purpose to be later described. Arranged on opposite sides of the bearing member 56 is a pair of spaced parallel plate 60, Figures 13 and 14. Each of the plates 60 is provided with a first rib 61 which is adapted to seat in one of the grooves 57 in the bearing member 56, and the plates 60 are also provided with a second rib 62 which is adapted to be seated in one of the sockets 59 or 59'. It will be noted that the width of the rib 62 is greater than the width of the rib 61, Figure 13. For maintaining these parts in assembled relation, a pair of headed cups 63 are provided. The pair of cups 63 are arranged in opposed relation with respect to each other, and the cups extend rotatably through registering openings 64 in the plate 60, and through an opening 65 in the bearing member 56. A coil spring 66 has its opposite ends connected to each of the cups 63 in order to urge the plates 60 toward each other, so as to maintain the particular head being used in its assembled position.

By means of the adjustable joint connection shown in Figures 11 through 14, any one of the utensil heads can be connected to the stem 50. Thus, either the spoon head 53, the fork head 54, or the spatula head 55 can be connected to or disconnected from the stem 50. Also, the angle of these heads relative to the stem 50 can be adjusted by simply gripping the stem 50 with one hand, then gripping the utensil head with the other hand, and turning the utensil head. When the utensil head has been turned to the desired angle, the ribs 61 of the plate 60 will have been rotated so that they seat in a corresponding groove 67 in the bearing member 56, whereby the utensil head will be maintained immobile in its adjusted position.

From the foregoing, it is apparent that a lid or cover has been provided for use on vessels, such as frying pans. The lid of the present invention includes the transparent, heat-resistant body 24, whereby the user can readily observe the contents of the vessel, such as the frying pan, while the foodstuffs are being cooked. Also, the lid of the present invention will prevent persons standing nearby from being splattered with hot grease or other foodstuffs. The shaft 47 of the utensil 48 can be slid into the opening 46 in order to properly stir foodstuffs in any part of the frying pan 20. When the utensil 48 is being used, it is in the solid line position shown in Figure 1, and when it is not being used, it can be moved to the dotted line position shown in Figure 1, whereby the spoon head 53 will rest on the ledge 27. Also, the support member 37 and the closure plug 36 can be interchanged in the openings 32 and 33, so that the utensil 48 can be positioned at any desired elevation. Furthermore, the heads 53, 54 and 55 are detachably mounted on the utensil 48, so that the user can attach whatever of these heads he desires to use. As previously described, the utensil is provided with a pivotal connection between the head and the stem 50, whereby these heads can be adjusted to any desired angle and maintained immobile in their adjusted positions.

The lid of the present invention will prevent grease from splashing onto the stove, and also will prevent children standing nearby from being burned by the hot splashing grease. Since the body 24 is made of transparent material, such as Pyrex glass, the user can observe the contents of the vessel without removing the lid from the pan. The various handles are made of a suitable heat-resistant material, so that they can be handled conveniently even though the vessel is very hot.

The height of the cover for the frying pan is determined by the size of the frying pan. For example, if the frying pan is twelve inches in diameter, the cover would be 6 inches high, or half the diameter of the frying pan.

I claim:

1. In combination, a frying pan including an annular side wall, a lid comprising a curved transparent body, a handle secured to the top of said body, there being registering vents in said handle and body, the lower portion of said body being provided with a cutout for snugly receiving therein the upper edge of said side wall, there being a pair of spaced openings in said body, a closure plug projecting through one of said openings, a support member projecting through the other of said openings, a ball rotatably supported by said support member, a utensil slidably projecting through said ball, an annular ledge projecting inwardly from said body and adapted to support said utensil when the utensil is not being used, and spring pressed detents for maintaining the closure plug and support member immobile on said body.

2. In combination, a frying pan including an annular side wall, a lid comprising a curved transparent body, a handle secured to the top of said body, there being registering vents in said handle and body, the lower portion of said body being provided with a cutout for snugly receiving therein the upper edge of said side wall, there being a pair of spaced openings in said body, a closure plug projecting through one of said openings, a support member projecting through the other of said openings, a ball rotatably supported by said support member, a utensil slidably projecting through said ball, an annular ledge projecting inwardly from said body and adapted to support said utensil when the utensil is not being used, and spring pressed detents for maintaining the closure plug and support member immobile on said body, said utensil comprising a shaft, a handle mounted on the upper end of said shaft, a stem detachably connected to said shaft, a spoon head, and means pivotally and detachably connecting said spoon head to said stem.

3. In combination, a frying pan including an annular side wall, a lid comprising a transparent body, a handle secured to said body, there being registering vents in said handle and body, said body being provided with a cutout for snugly receiving therein the upper edge of said side wall, there being a pair of spaced openings in said body, a closure plug projecting through one of said openings, a support member projecting through the other of said openings, a ball rotatably supported by said support member, a utensil slidably projecting through said ball, a ledge projecting inwardly from said body and adapted to support said utensil when the utensil is not being used, and spring-pressed detents for maintaining the closure plug and support member immobile on said body.

NICHOLAS J. MEDVED.

REFERENCES CITED

The following references are of record in the file of this patent:

UNITED STATES PATENTS

| Number | Name | Date |
|---|---|---|
| 909,052 | Barron | Jan. 5, 1909 |
| 975,336 | Doherty | Nov. 8, 1910 |
| 1,886,373 | Bracey | Nov. 8, 1932 |

FOREIGN PATENTS

| Number | Country | Date |
|---|---|---|
| 125,722 | Germany | Nov. 28, 1901 |